(12) United States Patent
Liu et al.

(10) Patent No.: US 12,734,794 B2
(45) Date of Patent: Sep. 15, 2026

(54) UNIVERSAL FILM APPLICATOR WITH LADDER-SHAPED BASE FOR AUTOMATIC POSITIONING OF MOBILE PHONE

(71) Applicant: WTL Technology Shenzhen CO., LTD., Shenzhen (CN)

(72) Inventors: Tak Nam Liu, Shenzhen (CN); Xiangqiang Liao, Shenzhen (CN); Xihua Xiao, Shenzhen (CN); Liren Luo, Shenzhen (CN)

(73) Assignee: WTL Technology Shenzhen CO., LTD., Shenzhen (CN)

( * ) Notice: Subject to any disclaimer, the term of this patent is extended or adjusted under 35 U.S.C. 154(b) by 121 days.

(21) Appl. No.: 18/887,045

(22) Filed: Sep. 17, 2024

(65) Prior Publication Data

US 2026/0048579 A1 Feb. 19, 2026

(30) Foreign Application Priority Data

Aug. 13, 2024 (CN) ........................ 202421956871.6

(51) Int. Cl.
*B32B 38/18* (2006.01)
*B32B 37/00* (2006.01)

(52) U.S. Cl.
CPC ...... *B32B 38/1833* (2013.01); *B32B 37/0053* (2013.01); *B32B 2457/20* (2013.01)

(58) Field of Classification Search
CPC ............ B32B 38/1833; B32B 37/0053; B32B 2457/20
See application file for complete search history.

(56) References Cited

U.S. PATENT DOCUMENTS

2016/0288470 A1* 10/2016 Wadsworth ........... B29C 66/342
2020/0147859 A1* 5/2020 Zhou ................... B29C 63/0073

FOREIGN PATENT DOCUMENTS

CN 219215543 U * 6/2023
EP 3381655 A1 * 10/2018 ......... B29C 63/0017
EP 3381656 A1 * 10/2018 .......... H04M 1/0202

* cited by examiner

*Primary Examiner* — Daniel McNally
(74) *Attorney, Agent, or Firm* — Jose Cherson Weissbrot

(57) ABSTRACT

The present application discloses a universal film applicator structure with a ladder-shaped base for automatic positioning of mobile phones, including a first housing, a phone slot, a lens groove, a support platform, a hinged bracket, a fixed plate, a sliding groove, an automatic contraction component, a thickness fine adjustment component, and a roller component, wherein the first housing is provided with a hinged bracket, and a fixed plate is fixedly connected to the hinged bracket, the fixed plate is embedded inside the support platform, and the fixed plate is slidably connected to the contraction plate in the automatic contraction component.

7 Claims, 8 Drawing Sheets

UNIVERSAL FILM APPLICATOR WITH LADDER-SHAPED BASE FOR AUTOMATIC POSITIONING OF MOBILE PHONE

CROSS-REFERENCE TO RELATED APPLICATIONS

This application is based upon and claims priority to Chinese Patent Application No. 202421956871.6, filed on Aug. 13, 2024, the entire contents of which are incorporated herein by reference.

TECHNICAL FIELD

The present disclosure relates to the technical field of mobile phone film application, particularly to a universal film applicator structure with a ladder-shaped base for automatic positioning of mobile phones.

BACKGROUND

Mobile phone film, also known as mobile phone beauty film or mobile phone protection film, is a type of cold mounting film that can be used to mount the surface, screen, and other tangible objects of a mobile phone. There are many types of film, and mobile phone film is not limited to mobile phones, can also be applied on MP3, MP4, computer screens, mice, sound boxes, and any physical objects that need protection. It is named after its original wide application for mobile phone beauty. A phone that is applied with mobile phone film looks refreshing and shining, not only face-lifting an old phone, but also protect the keyboard and screen against water and dust ingress;

Structurally, current film applicators used for mobile phones can basically meet the usage needs of film applicators, but still face certain shortcomings. Firstly, orders are seeking for the current market with quick and cost-effective solutions, and previously, the phones are positioned by the internal film applicator. The film applicator cannot be shared because each model needs to be customized for the phone with different sizes, therefore mold redesigning for different mobile phones poses higher cost. Additionally, the absence of products with a one click automatic positioning structure on the market reduces the user experience; Secondly, the current film applicator structure of mobile phones does not support thickness adjustment of the phone model. A new film applicator needs to be designed for mobile phones with different thicknesses, reducing the practicality of film applicator; Therefore, it is necessary to design a universal film applicator structure with a ladder-shaped base for automatic positioning of mobile phones to meet the current market demand.

SUMMARY

The purpose of the present disclosure is to provide a universal film applicator structure with a ladder-shaped base for automatic positioning of mobile phones to address the shortcomings of existing models, that is, unable to share the film applicator, without a structure that can automatically position with one click, and failure to adjust the thickness of mobile phone models.

In order to address the above technical problems, the present disclosure provides the following technical solution: a universal film applicator structure with a ladder-shaped base for automatic positioning of mobile phones, including a first housing, a phone slot, a lens groove, a support platform, a hinged bracket, a fixed plate, a sliding groove, an automatic contraction component, a thickness fine adjustment component, and a roller component, wherein the first housing is provided with a hinged bracket, and a fixed plate is fixedly connected to the hinged bracket, the fixed plate is embedded inside the support platform, and the fixed plate is slidably connected to the contraction plate in the automatic contraction component; a first connecting bolt and a second connecting bolt are symmetrically disposed on the contraction plate, one end of a third spring is connected to the first connecting bolt, and the other end of the third spring is connected to a protrusion at the bottom of the fixed plate, a long rack is sleeved on the second connecting bolt, one end of the long rack is fitted onto the limit block, and one side of the limit block is slidably connected to a movable pull block, the limit block is slidably connected to the limit plate, a fixed block is fitted on the top of the movable pull block, and the top of the fixed block is connected to one end of the first spring, the fixed block (33) is fixed to the fixed plate by a bolt, and the other end of the first spring is provided with a first button, a sliding groove is provided on the fixed plate, the second housing in the thickness adjustment component is slidably connected on the sliding groove, and a follow-up head is slidably connected in a through-hole on the outer side of the second housing, and a mobile phone support plate is fixed on other side of the second housing, and the follow-up head is connected to the slider, the slider is connected to one end of the fourth spring, and the other end of the fourth spring is fixed to the second housing, the slider is slidably connected to the follow-up block, and the bottom of the follow-up block is connected to one end of the fifth spring, and the other end of the fifth spring is connected to the second housing, one end of the sixth spring is disposed at the bottom of the second housing and the other end of the sixth spring is connected to the mobile phone slot.

Preferably, the roller component includes a handle, a connecting block, a seventh spring, and a roller, the connecting blocks are disposed on both sides of the handle, and a seventh spring is provided inside the connecting block, one end of the seventh spring is connected to a roller that is slidably connected in a groove on the connecting block.

Preferably, the automatic contraction component includes a first button, a first spring, a fixed block, a movable pull block, a limit block, a second spring, a limit plate, a long rack, a third spring, a first connecting bolt, a second connecting bolt, a contraction plate, and a damping gear body, one side of the long rack is meshed with the damping gear body, and the damping gear body is rotatably connected to the bottom of fixed plate.

Preferably, the thickness fine adjustment component includes a mobile phone support plate, a second button, a follow-up head, a second housing, a fourth spring, a fifth spring, a sixth spring, a follow-up block, and a slider, and the top of the follow-up block is provided with a second button, and the second button is slidably connected to the second housing.

Preferably, the fixed plate is provided with a lens groove and a phone slot.

Preferably, the other side of the limit block is connected to one end of a second spring, and the other end of the second spring is connected to a limit plate that is fixed at the bottom of the fixed plate.

Preferably, the fixed plate is provided with a hinged bracket, and the first button is slidably connected in a through hole on the movable pull block.

The present disclosure provides a universal film applicator structure with a ladder-shaped base for automatic positioning of mobile phones, which has the advantage that: after the first button is pressed, the wedge-shaped groove at the bottom of the first button will squeeze the movable pull block to slide backward on the fixed block, and then the wedge-shaped groove on one side of the movable pull block will squeeze the limit block to slide to one side, the connection between the protrusion on the limit block and the long rack disappears, thereby the fixed long rack will be released to slide downward due to the contraction of the third spring thereon, driving the contraction plate fixed on the long rack to slide downward; the mobile phone in the phone slot is pressed down to the ladder-shaped groove, and is centered due to the ladder-shaped groove, and it is unnecessary to customize a film applicator for each phone model when the phone size is different, thus reducing costs and improving user experience; the second button controls the tension and contraction of the fourth spring connected to one end of the follow-up head, in further controls the up and down displacement of the phone support plate set on the second housing; for the phones with different thicknesses, the position of phone support plate can be fine adjusted to control the up and down position of the phone in the phone slot, improving the practicality of the film applicator.

BRIEF DESCRIPTION OF THE DRAWINGS

In order to present a more explicit explanation of the embodiments of the present disclosure or the technical solutions in the prior art, a brief introduction will be given to the accompanying drawings required for the description of the embodiments or the prior art. Obviously, the accompanying drawings described below are some embodiments of the present disclosure. The persons having ordinary skill in the art can also obtain other drawings based on these drawings without creative effort.

Figure 1:
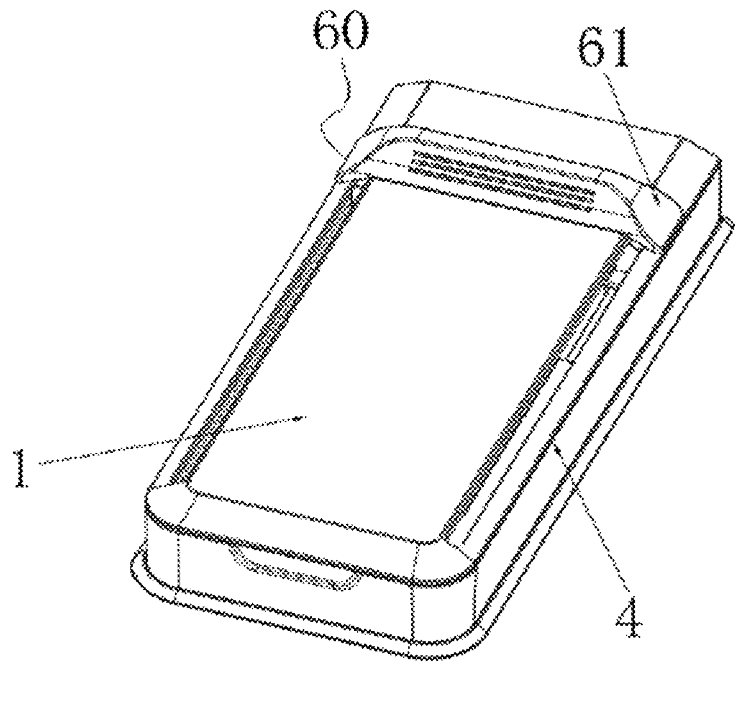
FIG. 1 is an overall schematic diagram of the present disclosure.

Reference Numerals: 1. First housing; 2. Mobile phone slot; 3. Lens groove; 4. Support platform; 5. Hinged bracket; 6. Fixed plate; 7. Sliding groove; 30. Automatic contraction component; 31. First button; 32. First spring; 33. Fixed block; 34. Movable pull block; 35. Limit block; 36. Second spring; 37. Limit plate; 38. Long rack; 39. Third spring; 40. First connecting bolt; 41. Second connecting bolt; 42. Shrinkage board; 43. Damping gear body; 50. Thickness fine adjustment component; 51. Mobile phone support board; 52. Second button; 53. Follow-up head; 54. Second shell; 55. Fourth spring; 56. Fifth spring; 57. Sixth spring; 58. Follow-up block; 59. Slider; 60. Roller component; 61. Handle; 62. Connection block; 63. Seventh spring; 64. Roller.

DETAILED DESCRIPTION OF THE EMBODIMENTS

In order to clarify the purpose, technical solution, and advantages of the embodiments of the present disclosure, a clear and complete description of the technical solution in the embodiments of the present disclosure will be presented in conjunction with the accompanying drawings. Obviously, the described embodiments are a part, not all of the present disclosure. Based on the embodiments of the present disclosure, all other embodiments obtained by the person having ordinary skill in the art without creative effort are within the scope of protection of the present disclosure.

It should be noted that in the description of the present disclosure, unless otherwise specified and limited, the terms "installation", "connected", and "connection" should be broadly understood, for example, can be fixed connection, detachable connection, or integral connection; can be mechanical connection or electrical connection; can be direct connection, indirect connection through an intermediate medium, or internal connection between two components. The person having ordinary skill in the art can understand the specific meanings of the above terms in the present disclosure in specific situations.

Figure 2:
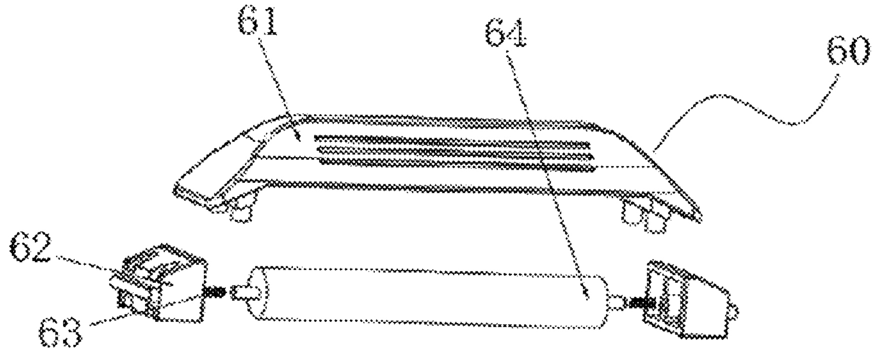
FIG. 2 is an exploded view of the structure of the roller component of the present disclosure.
Figure 3:
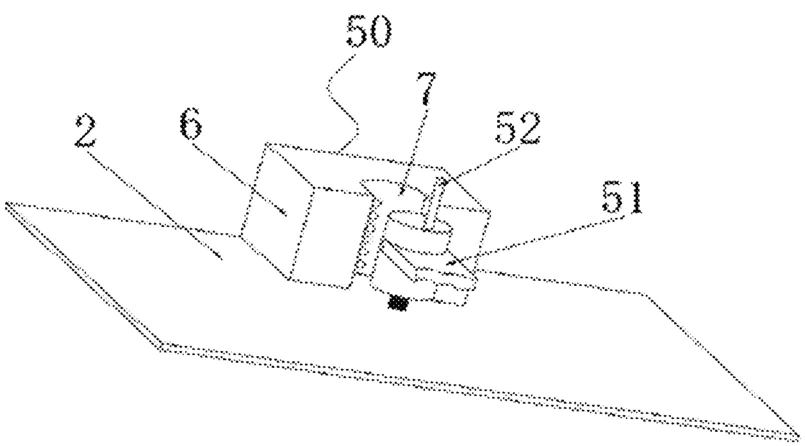
FIG. 3 is a schematic diagram of the assembly position of thickness fine-adjustment component of the present disclosure.
Figure 4:
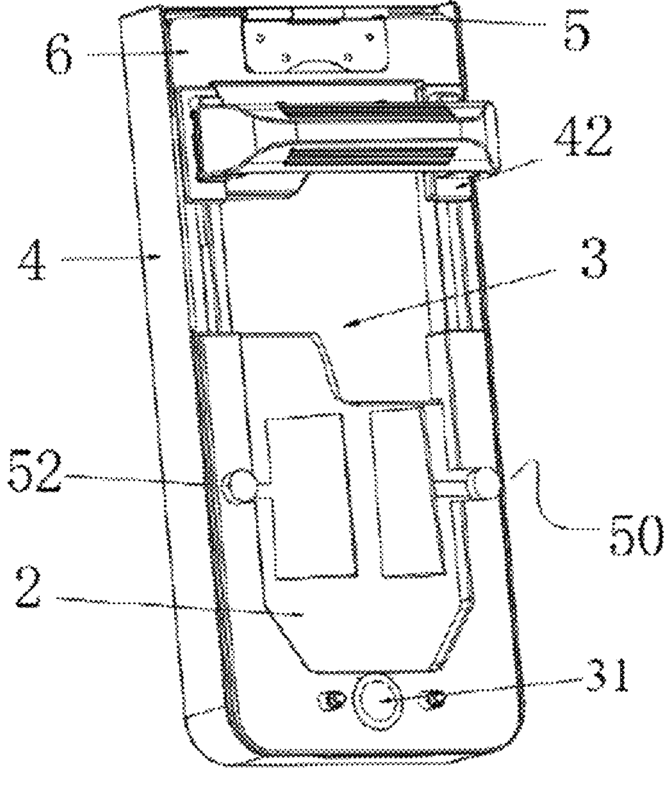
FIG. 4 is a schematic diagram of the overall structure of the present disclosure.
Figure 5:
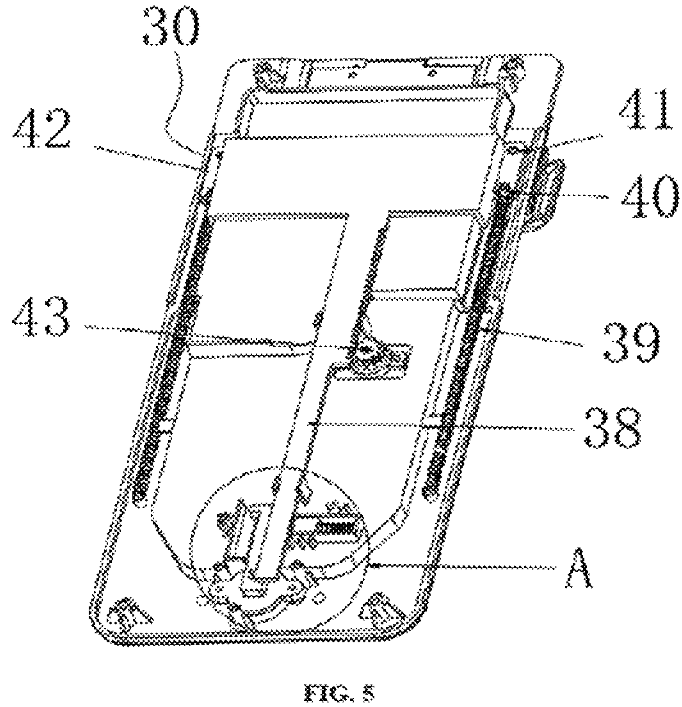
FIG. 5 is a schematic diagram of the structure of the automatic contraction component of the present disclosure.
Figure 6:
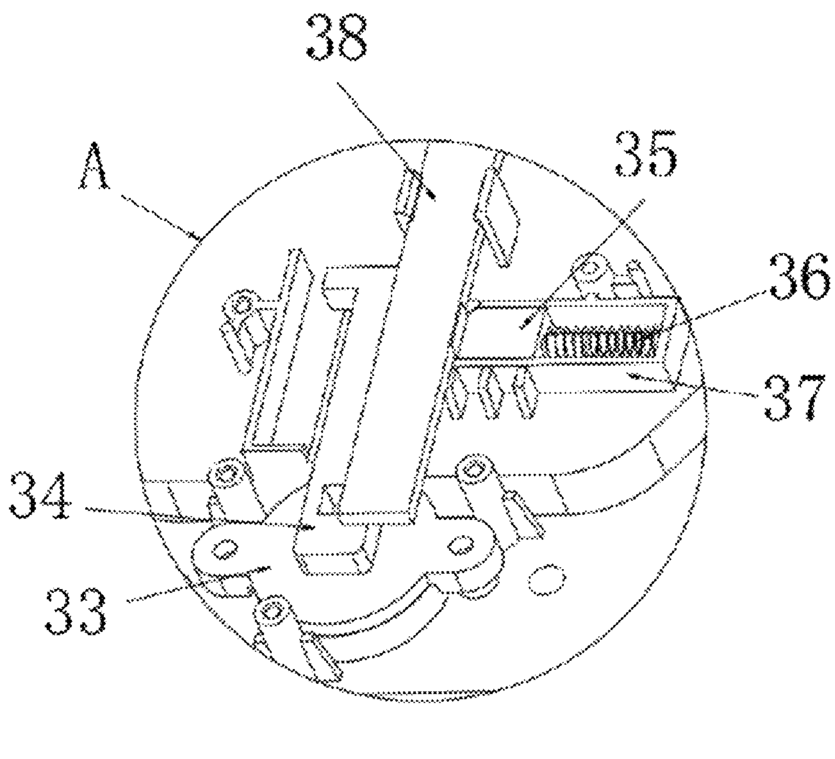
FIG. 6 is an enlarged view of Area A in FIG. 5.
Figure 7:
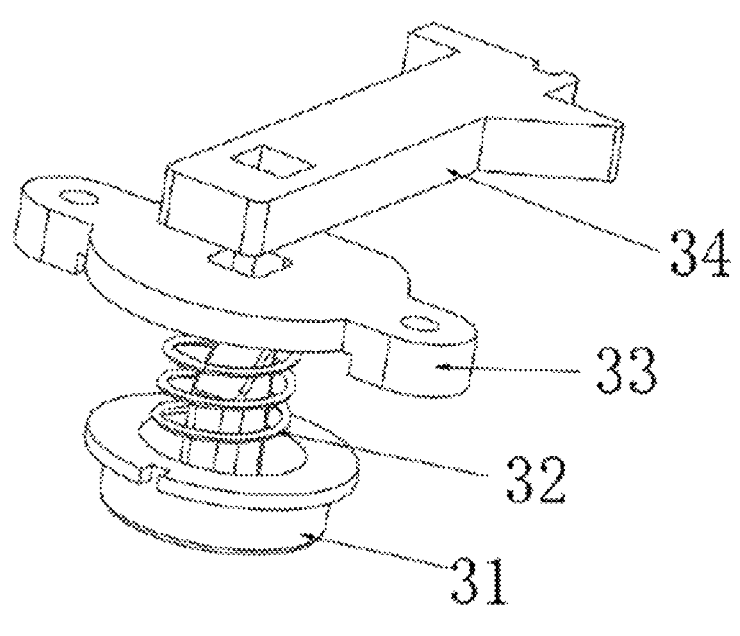
FIG. 7 is a schematic diagram of the partial structure of the present disclosure.
Figure 8:
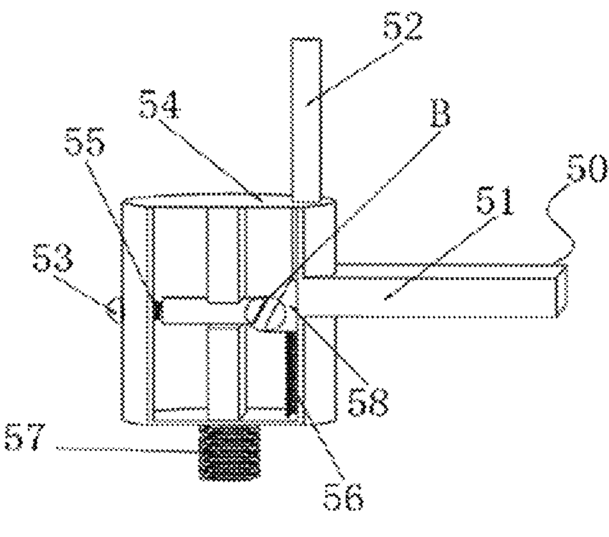
FIG. 8 is a schematic diagram of the internal structure of thickness fine-adjustment component of the present disclosure.
Figure 9:
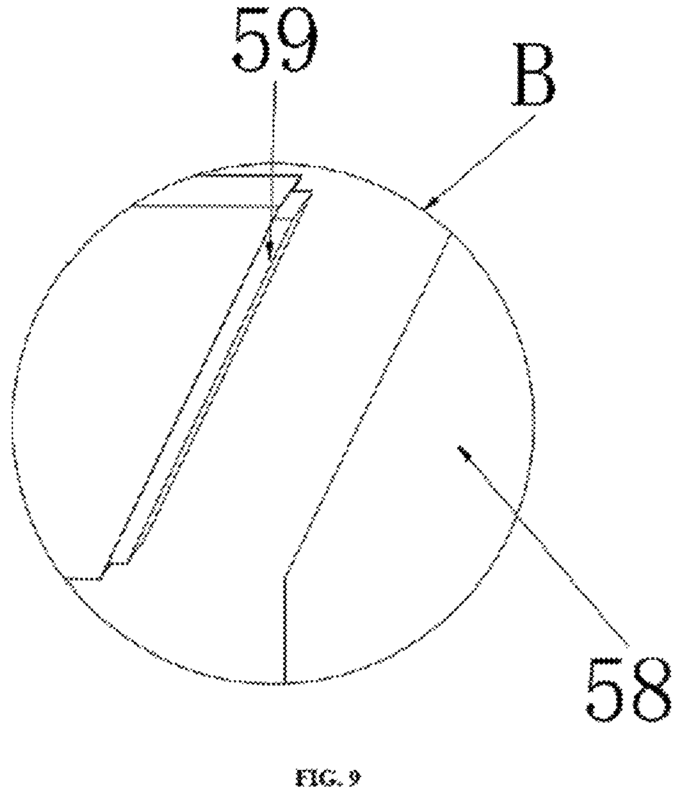
FIG. 9 is an enlarged view of Area B in FIG. 8.

Referring to FIG. 1-9, the present disclosure provides an embodiment: A universal film applicator structure with a ladder-shaped base for automatic positioning of mobile phones, including a first housing 1, a phone slot 2, a lens groove 3, a support platform 4, a hinged bracket 5, a fixed plate 6, a sliding groove 7, an automatic contraction component 30, a thickness fine adjustment component 50, and a roller component 60, wherein the first housing 1 is provided with a hinged bracket 5, the hinged bracket 5 is fixedly connected to a fixed plate 6, the fixed plate 6 is embedded inside the support platform 4, the fixed plate 6 is slidably connected to the contraction plate 42 in the automatic contraction component 30, and a first connecting bolt 40 and a second connecting bolt 41 are symmetrically disposed on the contraction plate 42, one end of a third spring 39 is connected to the first connecting bolt 40, and the other end of the third spring 39 is connected to a protrusion at the bottom of the fixed plate 6, a long rack 38 is sleeved on the second connecting bolt 41, one end of the long rack 38 is fitted onto the limit block 35, and one side of the limit block 35 is slidably connected to a movable pull block 34, the limit block 35 is slidably connected to the limit plate 37, a fixed block 33 is fitted on the top of the movable pull block 34, and the top of the fixed block 33 is connected to one end of the first spring 32, the fixed block 33 is fixed to the fixed plate 6 by a bolt, and the other end of the first spring 32 is provided with a first button 31, a sliding groove 7 is provided on the fixed plate 6, the second housing 54 in the thickness adjustment component 50 is slidably connected on the sliding groove 7, and a follow-up head 53 is slidably connected in a through-hole on the outer side of the second housing 54, and a mobile phone support plate 51 is fixed on other side of the second housing 54, and the follow-up head 53 is connected to the slider 59, the slider 59 is connected to one end of the fourth spring 55, and the other end of the fourth spring 55 is fixed to the second housing 54, the slider 59 is slidably connected to the follow-up block 58, and the bottom of the follow-up block 58 is connected to one end of the fifth spring 56, and the other end of the fifth spring 56 is connected to the second housing 54, one end of the sixth spring 57 is disposed at the bottom of the second housing 54 and the other end of the sixth spring 57 is connected to the mobile phone slot 2; the roller component 60 includes a handle 61, a connecting block 62, a seventh spring 63, and a roller 64, the connecting blocks 62 are disposed on both sides of the handle 61, and a seventh spring 63 is provided inside the connecting block 62, one end of the seventh spring 63 is connected to a roller 64 that is slidably connected in a groove on the connecting block 62; the automatic contraction component 30 includes a first button 31, a first spring 32, a fixed block 33, a movable pull block 34, a limit block 35, a second spring 36, a limit plate 37, a long rack 38, a third spring 39, a first connecting bolt 40, a second connecting bolt 41, a contraction plate 42, and a damping gear body 43, one side of the long rack 38 is meshed with the damping gear body 43, and the damping gear body 43 is rotatably connected to the bottom of fixed plate 6; the thickness fine adjustment component 50 includes a mobile phone support plate 51, a second button 52, a follow-up head 53, a second housing 54, a fourth spring 55, a fifth spring 56, a sixth spring 57, a follow-up block 58, and a slider 59, and the top of the follow-up block 58 is provided with a second button 52, and the second button 52 is slidably connected to the second housing 54; the first button 31 is slidably connected to the through hole on the movable pull block 34, the fixed plate 6 is provided with a lens groove 3, a phone groove 2, and a sliding groove 7, and the sliding groove 7 is provided with a U-shaped slot; the other side of the limit block 35 is connected to one end of a second spring 36, and the other end of the second spring 36 is connected to a limit plate 37 that is fixed at the bottom of the fixed plate 6, the fixed plate 6 is provided with a hinged bracket 5 that connects the fixed plate 6 and first housing 1 to form a rotatable structure of the first housing 1;

Specifically, when in use, the first housing 1 can be opened by rotating the hinged bracket 5 set on the fixed plate 6, and then when the phone is placed into the phone slot 2, after the first button 31 is pressed, the wedge-shaped groove at the bottom of the first button 31 will squeeze the movable pull block 34 to slide backward on the fixed block 33, and then the wedge-shaped groove on one side of the movable pull block 34 will squeeze the limit block 35 to slide to one side, the connection between the protrusion on the limit block 35 and the long rack 38 disappears, thereby the fixed long rack 38 will be released to slide downward due to the contraction of the third spring 39 thereon, driving the contraction plate 42 fixed on the long rack to slide downward; the mobile phone in the phone slot is pressed down to the ladder-shaped groove, and is centered due to the ladder-shaped groove, so that the film applicator can be shared when the phone size is different, dispense with customization for each phone model; after fixing the phone in the center, press the second button 52, and the follow-up block 58 fixed on the second button 52 will press down on the fifth spring 56, the wedge-shaped groove on the slider 59 will slide along the wedge-shaped groove on the follow-up block 58, thereby reducing the potential energy of the fourth spring 55 on the slider 59; the fixed follow-up head 53 connected to one end of the fourth spring 55 is released, and the follow-up head 53 will slide up and down along the groove 7 and, when no pressure is applied to the phone support plate 51 on the second shell 54, the sixth spring 57 at the bottom of the second shell 54 will push the second housing 54 upward and, when pressure is applied to the phone support plate 51, the second housing 54 will press down the sixth spring 57, and releasing the press on the second button 52 can adjust the position of the phone support plate 51, thereby completing a fine adjustment of the up and down position of the phone, and it is unnecessary to redesign the model for mobile phones with different thickness, thus improving the practicality of the film applicator; after fixing the height and thickness of the phone, apply the phone film that needs to be attached, rotate the first shell 1 to close, hold the handle 61 and roll it down until at the bottom, then roll it back to its original position, then open the first housing 1, take out the positioning film, push the contraction plate 42 upwards, drive the long rack 38 to slide upwards, and fix it with the limit block 35 again, and you can take out the phone and complete film application.

It should be noted that in the description of the present disclosure, unless otherwise specified and limited, the terms "installation", "connected", and "connection" should be broadly understood, for example, can be fixed connection, detachable connection, or integral connection; can be mechanical connection or electrical connection; can be direct connection, indirect connection through an intermediate medium, or internal connection between two components. The person having ordinary skill in the art can understand the specific meanings of the above terms in the present disclosure in specific situations.

The embodiments described above are only illustrative, in which the units described as separate components may or may not be physically separated, and the components displayed as units may or may not be physical units, that is, they can be located in one place or distributed across multiple network units. Some or all of the modules can be selected according to actual needs to achieve the purpose of this embodiment. The persons having ordinary skill in the art can understand and implement without creative effort.

Finally, it should be noted that the above embodiments are only used to illustrate but not to limit the technical solution of the present disclosure; Although the present disclosure has been described in detail with reference to the aforementioned embodiments, the persons having ordinary skill in the art should understand that they can still modify the technical solutions described in the aforementioned embodiments, or replace some of the technical features equivalently, and these modifications or replacements do not cause the essence of corresponding technical solutions depart from the spirit and scope of the embodiments of the present disclosure.

What is claimed is:

1. A universal film applicator structure with a ladder-shaped base for automatic positioning of mobile phones, comprising a first housing, a phone slot, a lens groove, a support platform, a hinged bracket, a fixed plate, a sliding groove, an automatic contraction component, a thickness fine adjustment component, and a roller component, wherein the first housing is provided with the hinged bracket which is fixedly connected to the fixed plate, the fixed plate is embedded inside the support platform and is slidably connected to a contraction plate of the automatic contraction component, a first connecting bolt and a second connecting bolt are symmetrically disposed on the contraction plate, one end of a third spring is connected to the first connecting bolt and the other end is connected to a protrusion at the bottom of the fixed plate, a long rack is sleeved on the second connecting bolt, one end of the long rack is fitted onto a limit block, and one side of the limit block is slidably connected to a movable pull block, the limit block is slidably connected to a limit plate, a fixed block is fitted on the top of the movable pull block, and the top of the fixed block is connected to one end of a first spring, the fixed block is fixed to the fixed plate by a bolt, and the other end of the first spring is provided with a first button, a sliding groove is provided on the fixed plate, a second housing of the thickness adjustment component is slidably connected on the sliding groove, and a follow-up head is slidably connected in a through-hole on the outer side of the second housing, and a mobile phone support plate is fixed on other side of the second housing, the follow-up head is connected to a slider which is connected to one end of a fourth spring, and the other end of the fourth spring is fixed to the second housing, the slider is slidably connected to a follow-up block, and the bottom of the follow-up block is connected to one end of a fifth spring, and the other end of the fifth spring is connected to the second housing, one end of a sixth spring is disposed at the bottom of the second housing and the other end is connected to the phone slot.

2. The universal film applicator structure with a ladder-shaped base for automatic positioning of mobile phones according to claim 1, wherein the automatic contraction component comprises the first button, the first spring, the fixed block, the movable pull block, the limit block, a second spring, the limit plate, the long rack, the third spring, the first connecting bolt, the second connecting bolt, the contraction plate, and a damping gear body, one side of the long rack meshes with the damping gear body which is rotatably connected to the bottom of the fixed plate.

3. The universal film applicator structure with a ladder-shaped base for automatic positioning of mobile phones according to claim 1, wherein the thickness fine adjustment component comprises the mobile phone support plate, a second button, the follow-up head, the second housing, the fourth spring, the fifth spring, the sixth spring, the follow-up block, and the slider, and the top of the follow-up block is provided with the second button which is slidably connected to the second housing.

4. The universal film applicator structure with a ladder-shaped base for automatic positioning of mobile phones according to claim 1, wherein the top of the first housing is slidably connected to a handle of the roller component, the roller component comprises the handle, a connecting block, a seventh spring, and a roller, the connecting blocks are disposed on both sides of the handle, and the seventh spring is provided inside the connecting block, one end of the seventh spring is connected to the roller which is slidably connected in a groove on the connecting block.

5. The universal film applicator structure with a ladder-shaped base for automatic positioning of mobile phones according to claim 1, wherein the fixed plate is provided with the lens groove and the phone slot.

6. The universal film applicator structure with a ladder-shaped base for automatic positioning of mobile phones according to claim 2, wherein one end of the second spring is connected to the other side of the limit block and the other end is connected to the limit plate which is fixed at the bottom of the fixed plate.

7. The universal film applicator structure with a ladder-shaped base for automatic positioning of mobile phones according to claim 1, wherein the first button is slidably connected in a through hole on one side of the fixed plate and a through hole on the movable pull block.

* * * * *